United States Patent [19]

Citron et al.

[11] Patent Number: 4,972,437
[45] Date of Patent: Nov. 20, 1990

[54] METHOD OF CONTROLLING LIMITED RESOURCE SESSIONS IN A DATA COMMUNICATIONS NETWORK

[75] Inventors: Andrew P. Citron, Raleigh; John E. Drake, Jr., Pittsboro; Marsha E. Ferree, Raleigh; John E. Fetvedt, Raleigh; James P. Gray, Chapel Hill; Zvonimir Ordanic, Raleigh, all of N.C.

[73] Assignee: International Business Machines Corporation, Armonk, N.Y.

[21] Appl. No.: 211,321

[22] Filed: Jun. 24, 1988

[51] Int. Cl.⁵ .............................................. H04M 3/20
[52] U.S. Cl. .................... 375/37; 340/825.07; 370/85.4
[58] Field of Search .......... 375/7, 8, 37, 121; 370/14, 16, 54, 85.1, 85.4, 119, 85.5; 371/11.2, 20.6; 340/825.06, 825.07; 364/402, 514; 379/219, 220, 221, 93, 94, 105

[56] References Cited
U.S. PATENT DOCUMENTS

3,525,817  8/1970  Richards ............................. 379/220
4,348,554  9/1982  Asmuth ............................... 379/221

Primary Examiner—Benedict V. Safourek
Attorney, Agent, or Firm—Gerald R. Woods

[57] ABSTRACT

The links in a data communications network following Systems Network Architecture may be categorized as limited resource links if those links are shared access transport facilities, such as a switched telephone network, X.21, X.25 or token ring local area network facilities. In setting up LU—LU sessions between network users, a limited resource session identifier field is set to a specific value if any of the links in the session data path is defined as a limited resource link. When a conversation between two users ends, the primary logical unit responds by determining whether the session has been identified as a limited resource session. If it has, the primary logical unit initiates action to deactivate the session without waiting for network control operation action. Allowing the primary logical unit to deactivate a limited resources session assures that the limited resource link or links will not remain allocated needlessly to an unused session.

6 Claims, 5 Drawing Sheets

METHOD OF CONTROLLING LIMITED RESOURCE SESSIONS IN A DATA COMMUNICATIONS NETWORK

FIELD OF THE INVENTION

The present invention relates to data communications and more particularly to a method of controlling limited resource sessions in a data communications network to reduce the amount of time such sessions remain active when no longer needed to support a conversation.

BACKGROUND OF THE INVENTION

For purposes of the following description, a communications network can be defined as a collection of nodes which are interconnected through communications links. Nodes can be characterized as either end nodes or network nodes. A network node is a data processing system that provides certain functions within the network, such as routing of messages between itself and its adjacent or neighboring nodes, selection of routes for messages to be transmitted between a network node and a directly-connected end node and the furnishing of directory services to end nodes. End nodes are also data processing systems that typically provide fewer functions than network nodes while providing an interface between users and the remainder of the network. The links between nodes may be permanent links, such as owned or leased cables, or temporary links that are enabled only when needed. An example of a temporary link is a dial-up telephone connection made through a public or a private telephone network.

When a session has been established, users may exchange data through the network. A session exists on a path through the network. Different users connected to a pair of nodes may use a session at different times. When two particular users are using the session at a given time, those users are said to be engaged in a conversation.

Network users, while most commonly thought of as human operators sitting at a terminal, are, from a network perspective, actually programs which cause data to be sent to and/or received from other programs attached to the network. The interface between a user and the network is a component referred to as a logical unit or LU. The LU may be implemented in hardware, in software or in a combination of the two. If a particular user causes the activation and deactivation of a session, the logical unit which serves as the interface between that user and the network is identified as the primary logical unit. The logical unit associated with the other user is identified as the secondary logical unit.

Sessions themselves may be viewed from the perspective of the logical units. If a logical unit controls the activation and deactivation of a session (the primary logical unit), then the session is characterized as a contention-winner session from the perspective of that logical unit. From the perspective of the other or secondary logical unit, the same session is characterized as a contention-loser session.

Two other terms are significant for purposes of this description. The first term is "control point". A control point activates network resources based on resource definition statements provided during configuration of the network. Control points activate, control and deactivate links through link stations provided in each node. The second term of significance is "control operator", which is a special type of program which normally performs the functions of controlling the number of active sessions between two partner LUs, assists LUs in the activation and deactivation of LU-LU sessions and the definition, modification, examination or deletion of operating parameters for logical units.

The terms described above are commonly used in descriptions of networks employing an architecture known as Systems Network Architecture. More comprehensive descriptions of the architecture and of the terms discussed above may be found in a variety of manuals available from the assignee of the present invention. Manuals providing a more comprehensive description of System Network Architecture include Systems Network Architecture Technical Overview (GC30-3073-2) copyright International Business Machines Corporation 1986 and Systems Network Architecture Concepts and Products (GC30-3072-3) copyright International Business Machines Corporation 1986. More comprehensive descriptions and definitions of the various terms discussed above may be found in Systems Network Architecture—Format and Protocol Reference Manual: Architecture Logic for Type 2.1 nodes (SC30-3422-0) copyright International Business Machines Corporation 1986 and Systems Network Architecture-Transaction Programmer's Reference Manual for LU Type 6.2 (GC30-3084-2) copyright International Business Machines Corporation 1985.

While the referenced manuals may provide additional information useful to a reader, those manuals are not required for an understanding of the present invention and are not being incorporated herein by reference.

The current process by which LU-LU sessions are established and terminated is well known. The process begins when an user sends an ALLOCATE verb to its own logical unit. Certain parameters are supplied with this ALLOCATE verb. The parameters include, among other things, the name of the remote LU at which a remote user is located, the network properties for the session to be allocated to a conversation between the two users and the name of the remote user. The primary LU responds to the ALLOCATE verb by sending an initiate request (INIT-SELF) to its control point. The parameters supplied with the ALLOCATE verb are passed along to the control point. The control point verifies that network resources are available to support a conversation between the local and remote users, computes the route through the network and returns the route information to the primary logical unit in a CONTROL INITIATE or CINIT response.

Assuming the network can support a conversation between the two users, the primary logical unit sends a BIND request through the network to the remote logical unit. The BIND request carries suggested parameters for the session. The remote logical unit may respond by accepting the suggested parameters or by suggesting alternative parameters. Assuming the original or the alternative parameters are acceptable to both LUs, the primary logical unit notifies the local user that a conversation has been allocated on a session by sending an ALLOCATE return code to the local user. The two users then exchange data through the network using available data protocols. One of the users issues a DEALLOCATE verb to end the conversation. That user's logical unit responds to the verb by including a Conditional End Bracket or CEB field in a header for the last data unit to be transmitted to the other user. The CEB field indicates the session is no longer required to support a conversation between the two users.

The session nevertheless remains active until the network control operator issues a DEACTIVATE SESSION request. Upon receipt of a DEACTIVATE SESSION request, the primary logical unit sends an UNBIND SESSION (UNBIND) request to the remote logical unit.

SUMMARY OF THE INVENTION

One drawback of the present process for activating and deactivating sessions is that network control operator action does not occur until some time after the need for a session actually ends. Maintaining a session beyond the time it is actually needed is of little significance if the links which support the sessions are dedicated links, such as owned or leased cables. However, if the links are limited resource links, such as switched links, maintaining the session over those links after the need has ended can be done only at a cost to the network.

The nature of the cost depends on the type of link. If the limited resource link is a switched link through the public switched telephone network, the cost may be unnecessary toll charges or unavailability of the telephone network facility to support other desired sessions. Other types of limited resource links include X.21, X.25 and token ring links, which can be characterized as shared access links. If one of these links is dedicated to sessions that are no longer being used to support a conversation, then that link cannot be reallocated to another node.

The invention is embodied in a method to be performed in a data communications network wherein logical units interposed between users and the network respond to requests from a user or from a network control operator to control the sessions over which the users engage in a conversation in which data is exchanged. Each session traverses serially-connected links and nodes to form a data path. The method allows a logical unit to control the deactivation of a session conducted using a limited resource link.

During its activation, each session is designated either as being a first type if it has one or more links with a predetermined characteristic or as a second type if it has no links with the predetermined characteristic. Other than to designate the session as being of a first type or a second type, the session is activated in accordance with known protocols and procedures. When it is determined that a session is no longer required for a conversation between the users, the primary logical unit can terminate an session of the first type without waiting for a request from the network control operator. If the session is of the second type, it is deactivated in response to action by the network control operator rather than the logical unit.

BRIEF DESCRIPTION OF THE DRAWINGS

While the technical description concludes with claims particularly pointing out and distinctly claiming that which is regarded as the present invention, details of a preferred embodiment of the invention may be more readily ascertained from the technical description when read in conjunction with the accompanying drawings wherein:

TECHNICAL DESCRIPTION

Figure 1:
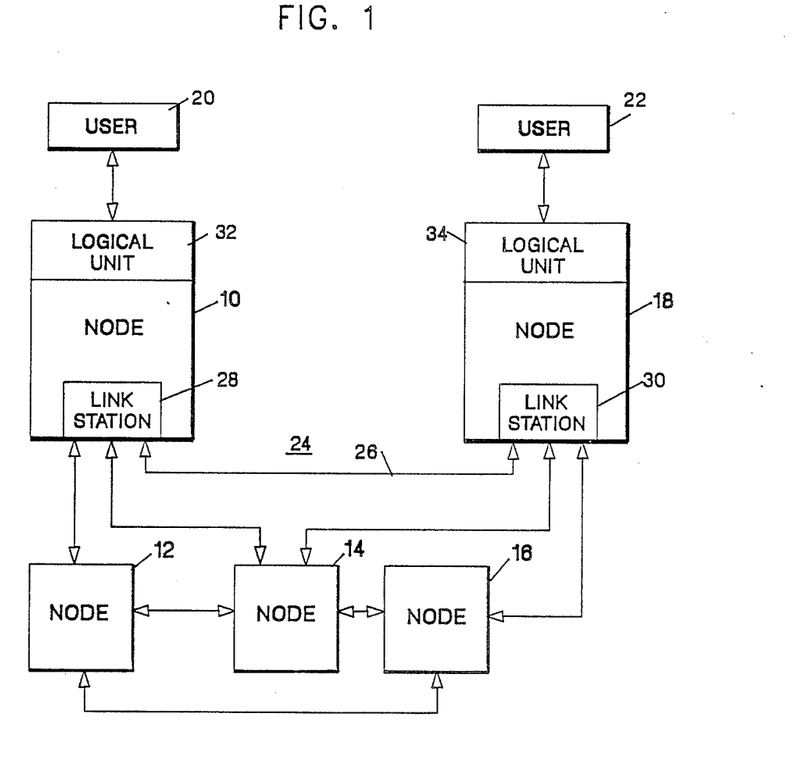
FIG. 1 is a general block diagram of a data communications network.

FIG. 1 illustrates major components of a data communications network. The network includes several nodes 10, 12, 14, 16 and 18. These nodes, each of which is implemented in a data processing system, can be included in data paths over which users 20 and 22 exchange data through the network. The node-to-node connections are provided by links, such as link 24 between nodes 10 and 18. Each link in the network consists of a link connection and a pair of link stations located in the connected nodes. With reference to the drawing, link 24 includes a physical medium 26, such as a telephone wire or a microwave beam, a link station 28 located in node 10 and a second link station 30 located in node 18. Expanded definitions of these terms may be found in a number of publications, including those referenced earlier.

The function of the data communications network is to establish and maintain routes or paths which allow users, such as users 20 and 22, to exchange data through the network. From a human perspective, a network user may be either an individual at a workstation or a program. From a network perspective, a user can always be represented by a program since even an individual must interact with the network through a program running at the user's workstation. Each user is connected to the network through a logical unit or LU which manages the exchange of data. Specifically, logical unit 32 provides an interface between user 20 in the network while logical unit 34 provides the interface for user 22.

For two users to exchange data, a logical state called a session must be set up through the network. From a system perspective, a session which allows users to exchange data is referred to as a logical unit-to-logical unit or LU-LU session. Sessions set up between the same two users at different times may include different nodes and links. For example, during one session, users 20 and 22 may exchange data over a path which consists of node 10, link 24 and node 18. At another time, the same users may utilize a session set up through nodes 10, 12, 14, 16 and 18 with the respective inter-node links. The actual use of a session for exchange of data by users is referred to as a conversation.

Figure 2:
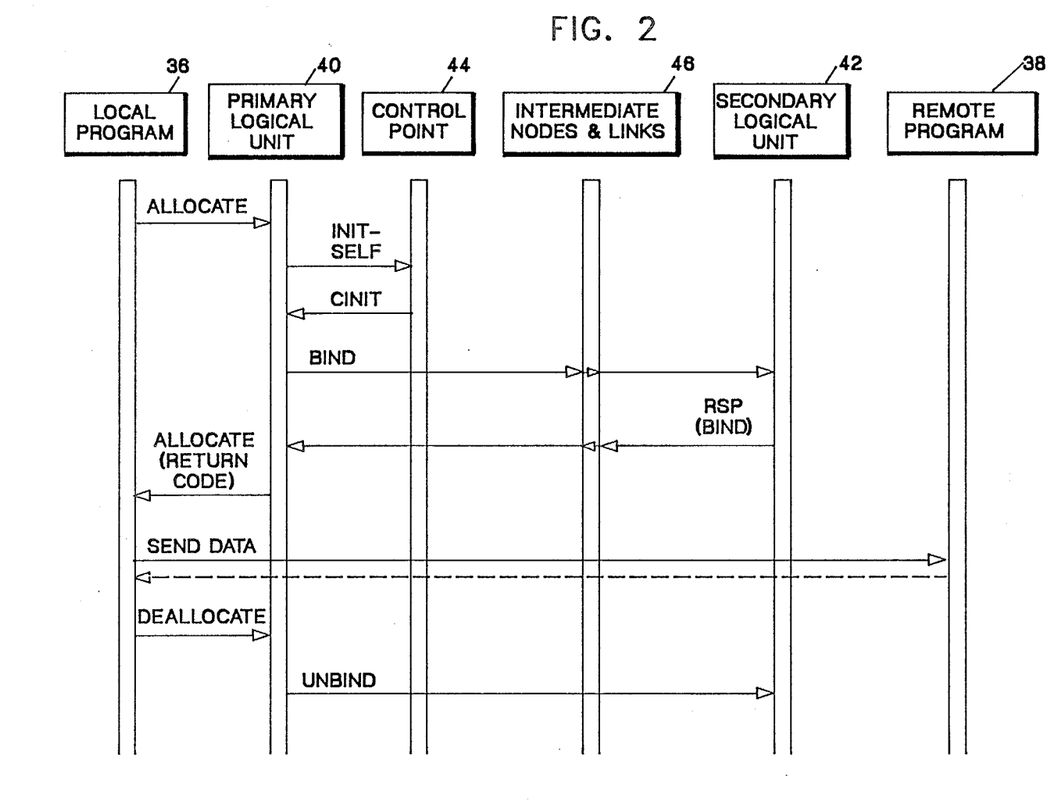
FIG. 2 is a chart of commands/requests which are issued within the network when the inventive method is being practiced.

FIG. 2 illustrates the process for activating and deactivating sessions in accordance with the present invention. In that figure, various physical/logical components are illustrated as blocks at the top of the figure. The users are represented by local and remote programs 36 and 38, respectively. The network interface to program 36 is a local logical unit 40. A remote logical unit 42 provides an interface to the network for program 38. Each SNA network includes control points, such as control point 44, which collaborate to manage the network. Control point functions are described in detail in the referenced publications. Only those functions essential to an understanding of the present invention are discussed below. A session makes use of intermediate nodes and links. The latter are represented only by block 46.

The first step in setting up a session is performed by the local user which issues an ALLOCATE request to the local logical unit 40. In accepted terminology, the ALLOCATE request is referred to as a verb. The ALLOCATE verb specifies the name of the remote user and the name of the logical unit at which the remote user is located. Of course, the remote user may be located at the same logical unit as the local user. The ALLOCATE verb also specifies a mode name designating the properties for the session to be allocated. Network properties include such things as the class of service to be used and whether the data is to be enciphered or perhaps translated to ASCII characters before it is sent.

The local logical unit 40 responds to the ALLOCATE verb by checking to see if an appropriate session already exists between the two users. If that session exists and is not being used for an active conversation, it can be used to satisfy the current ALLOCATE request. Assuming no appropriate session exists, the local logical unit 40 transmits an INITIATE-SELF (INIT-SELF) request to the control point 44. The INIT-SELF request contains the parameters provided by the ALLOCATE verb. Control point 44 performs a directory search to locate the various resources required to fulfill the INIT-SELF request. Control point 44 also computes a suitable route through the network for the session. The route includes the identity of the various nodes and links required to form a connection between the two end nodes. This information is transferred back to the local logical unit 40 in a CONTROL INITIATE or CINIT request. CINIT is considered a request since it functionally is a request that the local logical unit attempt to activate the LU-LU session. For purposes of this session, the LU receiving the CINIT request is identified as the primary logic unit for the session. The LU named in the CINIT request is referred to as the secondary logical unit.

The CINIT request includes a link definition for the link between the local node and the first intermediate node. One of the parameters in the link definition is a limited resource indicator (LRI) which indicates whether this link is a shared access transport facility such as a switched link. The use of the limited resource indicator is described in more detail later.

The local logical unit 40 responds to the CINIT request by sending a BIND SESSION or BIND request to the remote (secondary) logical unit. The BIND request, which is included within a message unit (MU), carries suggested parameters for the session and includes a limited resource indicator (LRI) field. When the BIND request is transmitted to the first of the intermediate nodes, the LRI field reflects only the definition of the link between the local node and the first intermediate node. The BIND request is processed at each of the intermediate nodes before being passed on to the next node. At each node, the incoming BIND request is inspected to determine whether the LRI indicator has been set indicating that one of the links upstream of the node is a limited resource link. The node also checks its own stored definitions for both the upstream and downstream links to see if either of the links is defined at the node as a limited resource link. If a limited resource is identified either in the incoming BIND request or in the stored link definitions, the LRI field of the BIND request is set at the node (or is maintained if it has already been set) before the BIND request is passed on to the next node.

The remote logical unit 42 responds to the BIND request with an RSP(BIND) response. The processing of an LRI field in the RSP(BIND) response is continued in the manner described above as the RSP(BIND) response is returned node-by-node to logical unit 40. If the BIND request is acceptable to the remote logical unit, the BIND response includes a complete set of session parameters. The parameters can match those received with the BIND request or can differ. If the parameters differ, the local logical units must accept the parameters proposed by the remote logical unit or the session will not be established. Assuming an acceptable set of parameters for the session can be established, the local logical unit 40 reacts to a positive BIND response by sending a positive ALLOCATE return code to the local user. The positive return code indicates that the session has bn established and that a conversation or exchange of data between the users 36 and 38 may commence. The users 36 and 38 then exchange data using known data protocols.

When the local user 36 transmits its last unit of data, it issues a DEALLOCATE verb. The local logical unit responds to this verb by including a Conditional End Bracket or CEB field in the header for the last data unit. If the session has been identified as having a limited resource link, the local logical unit 40 immediately sends an UNBIND request to the remote logical unit. This request allows the logical units to deactivate the established LU-LU session without waiting for any action or request from the control point 44. If the session had not been identified as having a limited resource link, the local logical unit 40 would normally wait for an action or request from control point 44 before starting the UNBIND processing.

Figure 3:
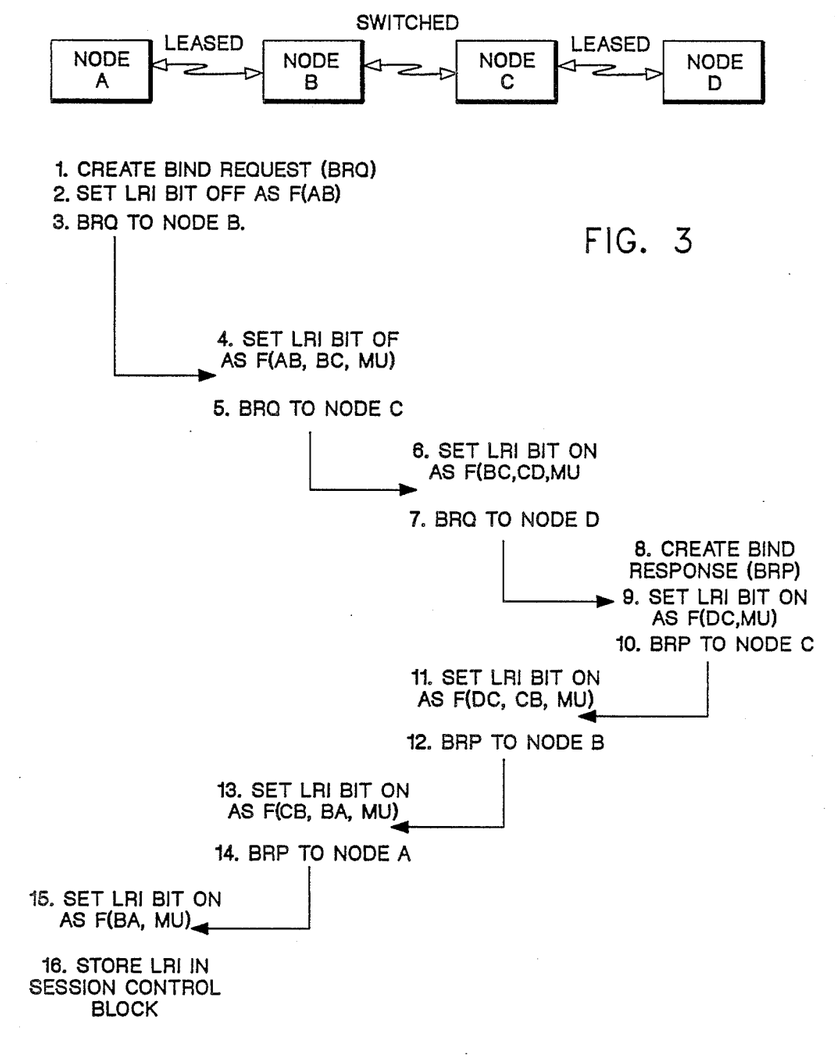
FIG. 3 illustrates the steps performed during processing of BIND requests during implementation of the inventive method.

FIG. 3 illustrates in more detail how a limited resources session is identified in the course of the BIND request/BIND response process. In FIG. 3, node A is the local node while node D is the remote node. It will be noted that the links between node A and B and then between C and D are shown as leased lines. Leased lines are not, by definition, considered to be limited resources. The link between nodes B and C, on the other hand, is shown as a switched link which may be defined as a limited resource at the discretion of the network configurer.

When the session is being set up, a BIND request or BRQ is created at node A. Node A will determine from its stored definition of link AB whether that link is a limited resource or not. Since link AB is a leased line, it is not a limited resource and an LRI bit in the BIND request is set to zero before the BIND request is transmitted to node B. Node B inspects the BIND request to determine the state of the LRI bit. It also looks at locally stored definitions of both links AB and BC to determine whether either link is defined within node B as a limited resource link. Since link BC is a switched or limited resource link, node B will set the LRI bit in the BIND request to one before transmitting the BIND request to node C. Node C repeats the same basic process as node B, setting the LRI bit to one if either the received BIND request or locally stored definitions for links BC or CD indicate a limited resource.

When the BIND request is received at the remote node, that node generates a BIND response. The BIND response also includes an LRI bit which is set to one if the LRI bit in the received BIND request had a value of one or if a data base at node D defined link CD as a limited resource. The BIND response is transmitted to node C which reacts to the BIND response in the same way that it reacted to the BIND request initially. That is, node C sets the LRI bit to one in the BIND response if the LRI bit in the message unit received from node D had a value of one or if node C defined either of links BC or CD as a limited resource. The BIND response is then passed on to node B which treats the BIND response message unit in a similar manner before passing it to node A. Node A sets the LRI bit as a function of the message unit received from node B and of its stored definition of link AB. Node A then proceeds to store the LRI indicator in a session control block. The stored LRI indicator is used in a manner to be described when the session is to be deactivated.

It should be evident that there is a considerable amount of redundancy in the process described. This redundancy is desirable since any given node in a network may be a "down level" node which does not necessarily support stored link definitions indicating whether a particular link is a limited resource or not. The described redundancy prevents a down level node from falsely setting an LRI indicator to zero.

Figure 4:
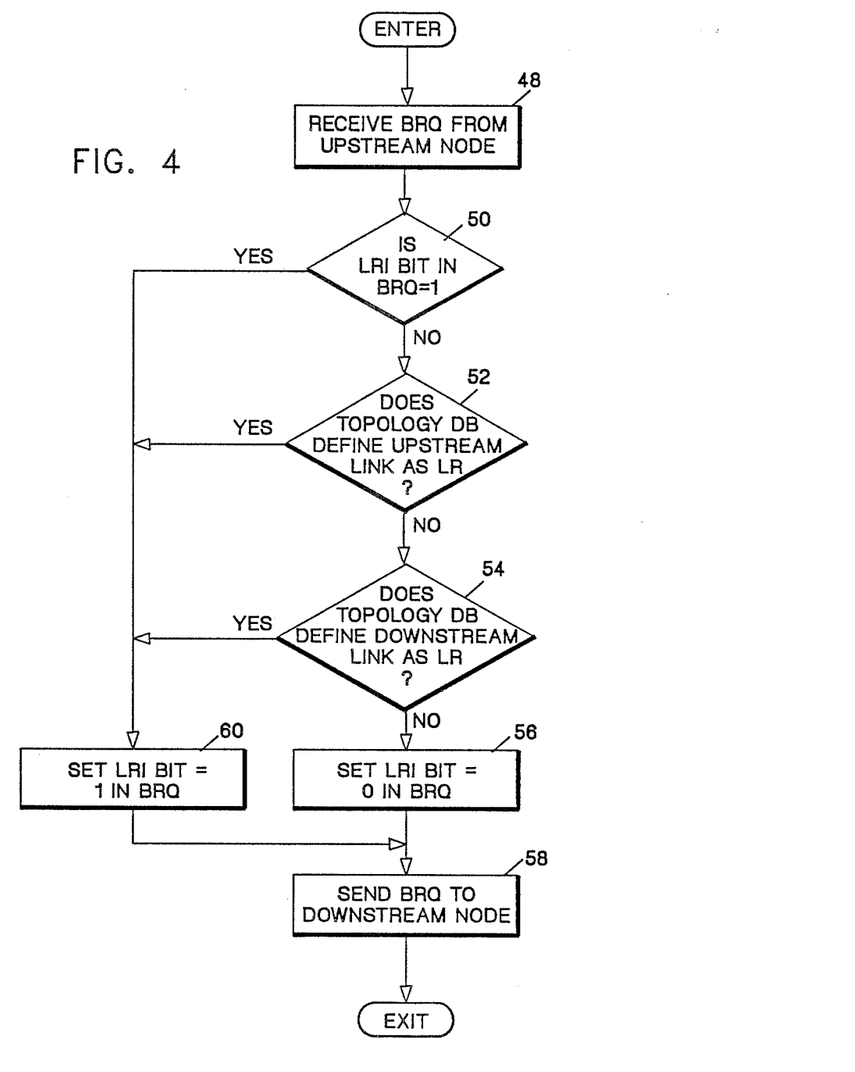
FIG. 4 is a flow chart of steps performed at each node in identifying and indicating a limited resource session.

FIG. 4 is a flow chart of the steps that are performed at each node in the process generally described with reference to FIG. 3. The node performing the process must, of course, receive a BIND request or BRQ from an upstream node (operation 48). The receiving node inspects the LRI indicator in the BIND request to determine whether the LRI bit has a value of one (operation 50). If the LRI bit is equal to zero, the node determines (operation 52) whether its topology database defines the upstream link as a limited resource. If the upstream link is not a limited resource, the node also checks the topology database (operation 54) to determine whether the downstream link is defined as a limited resource. If all decision blocks 50, 52 and 54 yield a negative result, the LRI bit in the BIND request is set to zero (operation 56) and the BIND request is transferred to the downstream node in a operation 58.

On the other hand, if any of the decision blocks 50, 52 and 54 yield a positive result, the LRI bit in the BIND request is set to one (operation 60) before the BIND request is transmitted to the downstream node in operation 58.

Figure 5:
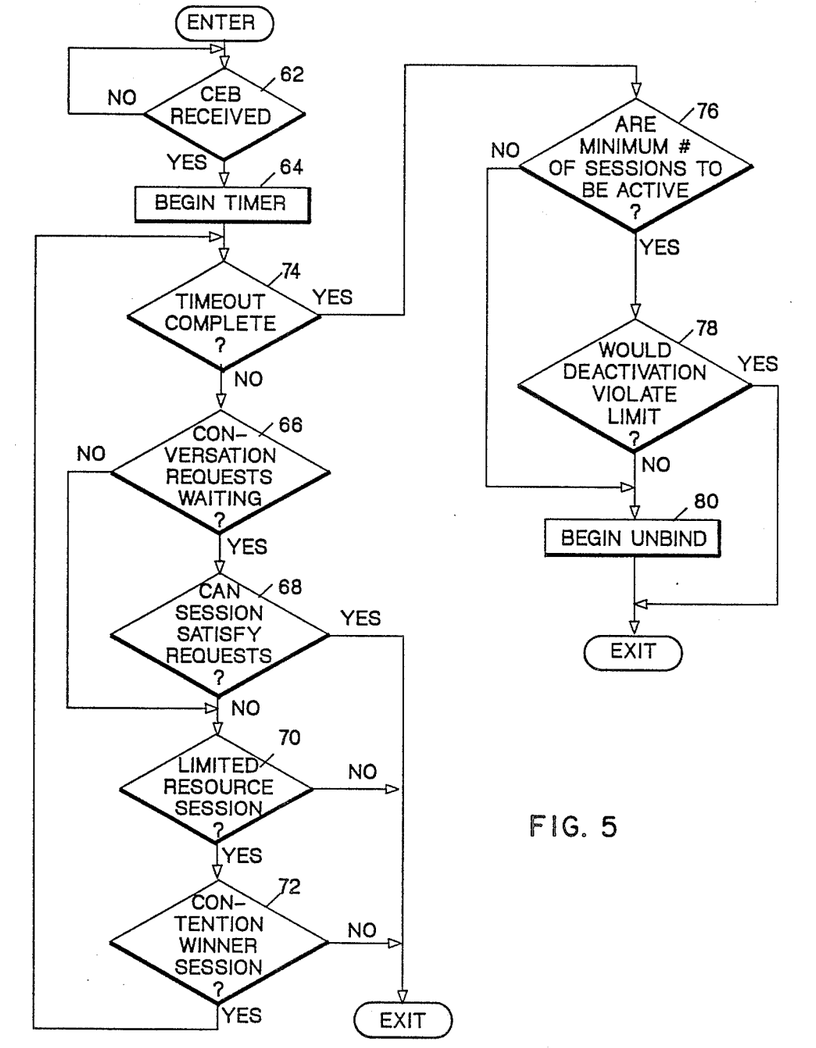
FIG. 5 is a flow chart of steps performed when a session is no longer needed to support a conversation between two users.

FIG. 5 is a flow chart of the steps performed at the local or primary logical unit when the conversation between the local and the remote users ends. The primary logical unit looks for a DEALLOCATE verb from the user. When a DEALLOCATE verb is received, the logical unit may cause a timer to be started in an operation 64. The function of this timer is simple. While the session may no longer be required for a conversation between the current users, there is always the possibility that other users may wish to engage in a conversation between the same two logical units. The optional timer started in operation 64 simply allows time for potential session users to request use of the session. For reasons which will be given below, operation 64 is followed immediately by a check 74 as to whether the time period has elapsed. The logical unit then checks (operation 66) to determine whether there are existing conversation requests; that is, requests for use of a session between the two partner logical units. If there are any existing requests, the logical unit must still determine whether the current session can accommodate any one of the requests. A current session will not always be able to satisfy a request for a conversation between the two logical units if the parameters of the current session are inconsistent with the parameters requested by the potential users. For example, the potential users may need an encrypted session while the current session provides only for exchange of non-encrypted data. If operation 68 determines that the current session could accommodate an existing conversation request, the session-deactivation process is ended and use of the session is transferred to the waiting users.

If, however, operation 66 had indicated that there were no waiting conversation requests or if operation 68 had indicated that the session could not accommodate waiting conversation requests, the logical unit would then check the LRI bit in its session control block (operation 70) to determine whether the session had been identified as a limited resource session. If the session were not a limited resource session, control of the deactivation process would then pass to the control point in a process external to the process being described here. If operation 70 indicated the session were a limited resource session, a further determination must be made as to whether the session is a "contention-winner" session as to the node doing the processing. This determination, made in an operation 72, is necessary to prevent the secondary logical unit from deactivating the session.

The timer started in operation 64 continues to run as operations 66, 68, 70 and 72 are carried out, perhaps one or more times whenever a conversation ends. When the timeout period has elapsed, a check must be made in operation 76 to determine whether a minimum number of sessions are to remain active between the two logical units at any given time. If the node-to-node traffic is expected to be high or if node-to-node communication must be maintained with a high degree of reliability, multiple, parallel sessions may be set up along with a requirement that a minimum number of those sessions remain active at any given time. If determination 76 shows that a minimum number of sessions are to be maintained, a further check (operation 78) is made as to whether deactivation of the current session would violate the limit on the minimum number of sessions to be maintained. If deactivation of the current session would reduce the number of active sessions below the set limit, the process ends without the current session being deactivated. If, however, check 76 shows there is no minimum number of sessions to be maintained or if check 78 shows that deactivation of the current session would not violate any limit on the number of sessions to be maintained, the local or primary logical unit initiates UNBIND processing in an operation 80. The UNBIND processing results in deactivation of the session.

To recap the contents of the figures, the BIND processing establishes whether any link in a session being activated is a limited resource link. If any link is a limited resource link, the entire session is designated a limited resource session. If a session is a limited resource session, the primary logical unit may take steps to deactivate that session without waiting for control point action. Allowing the primary logical unit to deactivate the session reduces the amount of time the limited resource link remains active, supporting sessions that are not being used. As mentioned earlier, this has the effect of reducing the cost of network operation and assuring maximum availability of the limited resource link.

While there has been described what is thought to be a preferred embodiment of the invention, variations and modifications in the invention will occur to those skilled in the art once they become aware of the basic inventive concepts. Therefore, it is intended that the appended claims shall be construed to include not only the preferred embodiment but all such variations and modifications as fall within the true spirit and scope of the invention.

We claim:

1. In a data communication network wherein logical units interposed between users and the network may be logically connected in sessions over which the users can engage in a conversation to exchange data through the network, each session being conducted using serially-connected links and nodes which form a data path between two users at first and second nodes, a method of allowing a logical unit at the first node to selectively terminate a session as a function of a characteristic of one or more of the links in the data path to the second node, said method comprising the steps of:
   designating each session, during its activation, as being a first type if it has one or more links with a predetermined characteristic or as a second type if it has no links with the predetermined characteristic;
   determining when a session is no longer required to conduct a conversation between the users;
   terminating any session of the second type that is determined to be no longer required only upon receipt of a termination request from a network control operator; and
   terminating any session of the first type that is determined to be no longer required without waiting for a request from a network control operator.

2. A method as defined in claim 1 wherein the predetermined characteristic is that the link is a limited resource link and wherein any session containing a limited resource link is identified as a limited resource session.

3. A method as defined in claim 2 wherein said designating step comprises the further steps of:
   generating a session-activation request;
   initiating transmission of the request along the data path to the second node;
   waiting for a reply to the request, said reply indicating whether any of the links in the data path is a limited resource link; and
   designating the session as a limited resource session if the reply indicates that at least one of the links on the data path is a limited resource link or as other than a limited resource session if the reply indicates that none of the links on the data path is a limited resource link.

4. A method as defined in claim 3 wherein said terminating step is preceded by the additional steps of:
   determining whether a predetermined minimum number of active sessions is to be maintained between the two end nodes in the data path; and
   proceeding with the termination step only if the termination would not reduce the number of active sessions to less than the predetermined minimum number of sessions to be maintained.

5. A method as defined in any of claims 3 or 4 further including the step of delaying termination of a session of the first type for a predetermined period of time to allow the session to be available for other conversations between users connected to the two end nodes in the data path.

6. A method as defined in claim 2 wherein said designating step comprises the further steps of:
   at the end node to which the first user is connected
   determining whether the link between the end node and the next node in the data path is defined at the node as a limited resource link,
   generating a bind request including a session-identifier field containing a first value if the link is a limited resource link and a second value if the link is not a limited resource link,
   transmitting the bind request to the next node in the data path,
   at any intermediate node in the data path
   determining whether the bind request received from an adjacent node contains a session-identifier field with a first value,
   determining whether either link in the data path adjacent the intermediate node is defined at the node as a limited resource link,
   setting the session-identifier field in a bind request to the first value if the corresponding field in the received bind request had the first value or if the node defined either adjacent link as a limited resource link or to the second value if the corresponding field in the received bind request had the second value and neither adjacent link was defined as a limited resource link,
   transmitting the bind request to the next node in the data path,
   at the end node to which the second end user is connected
   determining whether the bind request received from the adjacent node includes a session-identifier field set to the first value,
   determining whether the end node defines the link to the adjacent node as a limited resource link, and
   generating a bind response with the session-identifier field set to the first value either if the session-identifer field in the received bind request was set to the first value or if the end node defines the adjacent link as a limited resource link.

* * * * *